United States Patent

Topolski et al.

[11] Patent Number: 6,053,722
[45] Date of Patent: Apr. 25, 2000

[54] NITRIDED H13-ALLOY CYLINDRICAL PELLETING DIES

[75] Inventors: Mark J. Topolski, Indianapolis; Carl R. Allis, Crawfordsville, both of Ind.

[73] Assignee: Consolidated Process Machinery, Inc., Merrimack, N.H.

[21] Appl. No.: 09/122,858

[22] Filed: Jul. 28, 1998

[51] Int. Cl.[7] ...................................................... B29B 9/00
[52] U.S. Cl. .......................... 425/313; 425/331; 425/464; 425/DIG. 230
[58] Field of Search .................................... 425/311, 313, 425/314, 331, 464, DIG. 230

[56] References Cited

U.S. PATENT DOCUMENTS

| | | | |
|---|---|---|---|
| 4,457,686 | 7/1984 | Rowland | 425/463 |
| 4,496,298 | 1/1985 | Munch | 425/331 |
| 4,574,459 | 3/1986 | Peters | 425/464 |
| 4,659,299 | 4/1987 | Pierik | 425/DIG. 230 |
| 4,746,698 | 5/1988 | Kouyama et al. | 524/396 |
| 4,765,847 | 8/1988 | Arai et al. | 148/15.5 |
| 5,370,171 | 12/1994 | Fields et al. | 164/133 |

FOREIGN PATENT DOCUMENTS

| | | | |
|---|---|---|---|
| 63-270807 | 11/1988 | Japan | 425/464 |
| 3-71996 | 3/1991 | Japan . | |
| 8-66720 | 3/1996 | Japan . | |
| 1390929 | 4/1975 | United Kingdom . | |

OTHER PUBLICATIONS

"Densification Equipment for the Chemical, Thermoplastic, and Process Industries," CPM Series C Process Pellet Mills brochure, Copyright CPM (1983).

"Gas Nitriding," Knerr et al.; Surface Hardening of Steel, pp. 387–409.

"Pelleting—Introduction and General Definitions," Robinson, Basic Processing Operations, p. 103 (No date).

"Hot–Work Steels," Specialty Steels and Heat Resistant Alloys, p. 762.

*Primary Examiner*—Robert Davis
*Attorney, Agent, or Firm*—Nixon & Vanderhye P.C.

[57] ABSTRACT

A pelleting die is provided, preferably in cylindrical form. The die includes a cylindrical body having inner and outer cylindrical surfaces and holes through the surfaces in which particulate material is extruded to form pellets. The die is formed of an H-group steel alloy, preferably H13 alloy, with the surfaces being nitrided to provide increased surface hardness, resistance to wear, improved fatigue life and improved corrosion resistance.

13 Claims, 2 Drawing Sheets

NITRIDED H13-ALLOY CYLINDRICAL PELLETING DIES

BACKGROUND AND DISCLOSURE OF THE INVENTION

This invention relates to pellet mills used to form pellets from a flowable stream of material such as slurries and viscous liquids and/or solids to form them into three-dimensional articles of a defined shape by compressing and pelleting the material to be processed. This may include plastics, minerals, waste, agricultural products and animal feed, among other things. The pelleting process yields products that are relatively easy to handle, store, transport and use.

The flowable stream of material to be pelletized may vary widely in its characteristics with regard to relative hardness/ability to abrade and corrosivity.

The pelleting device is a perforated layer of metal, called a die, which may be of any desired configuration such as a flat steel plate or, in the case of the present invention in its preferred aspect, a cylindrical die having a plurality of holes through which the flowable stream of material is passed and pelletized. Mechanical energy is supplied to the flowable stream of material and this energy, in turn, forces the material through the die where it attains a pellet-like shape and is exited from the die. The pelleting process generates significant stresses in the pellet mill die such that physical design factors of the die directly relate to the capacity of the material from which the die is formed to withstand the challenge of the pelleting process which in addition to pressure includes potentially corrosive materials and highly abrasive substances. The flowable stream of material is mechanically pressed against the die surface and pushed through the die as it is converted from a flowable stream of material to a three-dimensionally shaped pellet.

The working surface of the die, that is the surface of the die exposed directly to contact with the mechanical means forcing the flowable stream of material through the die, the die holes themselves and the opposite side of the die from the working surface are subject to mechanical and sometimes corrosive and abrasive forces. We have surprisingly found that forming the die from a hot-work tool steel arid nitriding the working surface of the die not only provides a more robust, longer-lasting die under conditions of high pressure, temperature and abrasion but also have observed an increased throughput through the die, and an increase in the production rate that was not expected.

Preferably the material from which the die is fabricated is a chromium hot-work steel in the type H10, up to and including the H19 range. We have found that these chromium hot-work steels have good resistance to heat softening owing to their chromium content and include carbide-forming elements. This resistance to heat softening permits the heat treat formation of a nitrided surface on the die while substantially maintaining high core hardness.

Preferred is H13, a "Hot-Work" tool steel originally developed for use in manufacturing tooling for the metal-forming industry. H13 is one of several steels of the H-group of hot-work tool steels. This group of steels was developed to resist softening at hot metal working service temperatures of 900° to 1400° F. (480° to 760° C.) and are commonly used in manufacturing hot-metal-forging dies, hot-metal-extrusion dies, cold-metal-forming dies, and metal-shearing knives. Nitriding is sometimes used in treating H13 hot-metal-extrusion dies to increase service life. This invention includes the use of all H-group steels as cylindrical feed pelleting die steel in the case-hardened (nitrided, carburized, nitrocarburized, etc.) condition.

The ability of these hot-working steels to resist softening at elevated temperatures, for instance, in the case hardening range of 900° to 1400° F., (480° to 760° C.) means they are adapted to substantially maintaining high core hardness during surface heat treatment procedures. In particular gas nitriding is preferred as a case-hardening process in which nitrogen is introduced into the surface of the steel. This process results in an increased surface hardness, improved resistance to wear, improved fatigue life and improved corrosion resistance. The hot-work tool steel nitrided surface pelleting dies of the present invention are able to maintain core hardness values above 50 HRC. In some instances, the resistant nitrided surface layer is greater than 67 HRC while the core of H13 tool steel has a value of 55 HRC.

A particular design, configuration and physical arrangement of the dies vary widely depending upon the material being processed. The number of holes in a given surface area (hole count) and patterning which the holes are displayed will vary accordingly. Preferably the holes include a "relief" area which allow the operator to exercise control over pellet size and throughput.

In a preferred embodiment according to the present invention, there is provided a pellet mill die construction for pelleting particulate material, comprising a pelleting die having first and second surfaces on opposite sides of the die and a plurality of die holes through the die extending between the first and second surfaces for passing the particulate material between the first surface and the second surface, the die being formed of H-group steel, with one of the first surface, the second surface and the plurality of die holes having a nitrided surface layer for wear resistance.

In a further preferred embodiment according to the present invention, there is provided a pelleting mill comprising a particulate material feeder, an inlet for supplying particulate material to the feeder, a cylindrical pelleting die for receiving the particulate material from the feeder, the pelleting die having inner and outer surfaces and a plurality of die holes through the cylindrical die extending between the inner and outer surfaces for passing the particular material from the inner surface through the holes to the outer surface, one of the inner surface, the outer surface and the plurality of holes having a nitrided surface layer formed on an H-group alloy for wear resistance and an outlet for discharging the pellets from the pellet mill.

BEST MODE FOR CARRYING OUT THE INVENTION

Figure 1:
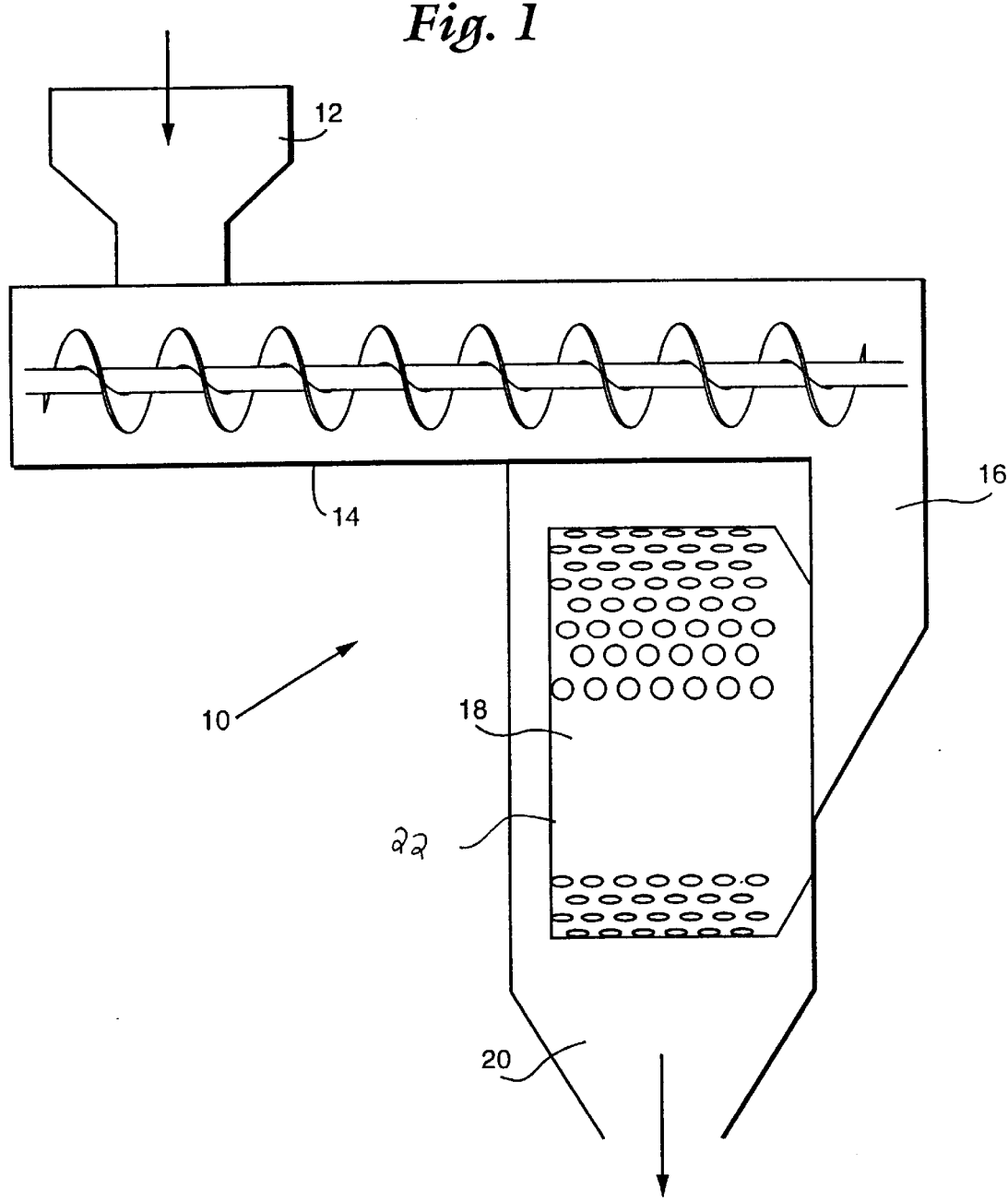
FIG. 1 is a schematic representation of a pellet mill employing a pelleting die according to the present invention.

Referring now to the drawings, particularly to FIG. 1, there is illustrated a pelleting mill, generally designated 10. Pelleting mill 10 includes an inlet chute 12 for receiving particulate material, an auger 14 for advancing the particulate material received through the inlet 12, a chute 16 for conveying the particulate material into a die 18 and an outlet chute 20 for receiving and discharging pellets formed by the pelleting mill. The foregoing pellet mill has been described only in very general terms and it will be appreciated that additional elements may be provided the pellet mill. For example, an axial steam injection system may be interposed between the auger and the inlet to the die 18 for supplying moisture to the particulate material as it undergoes the pelleting process.

Figure 2:
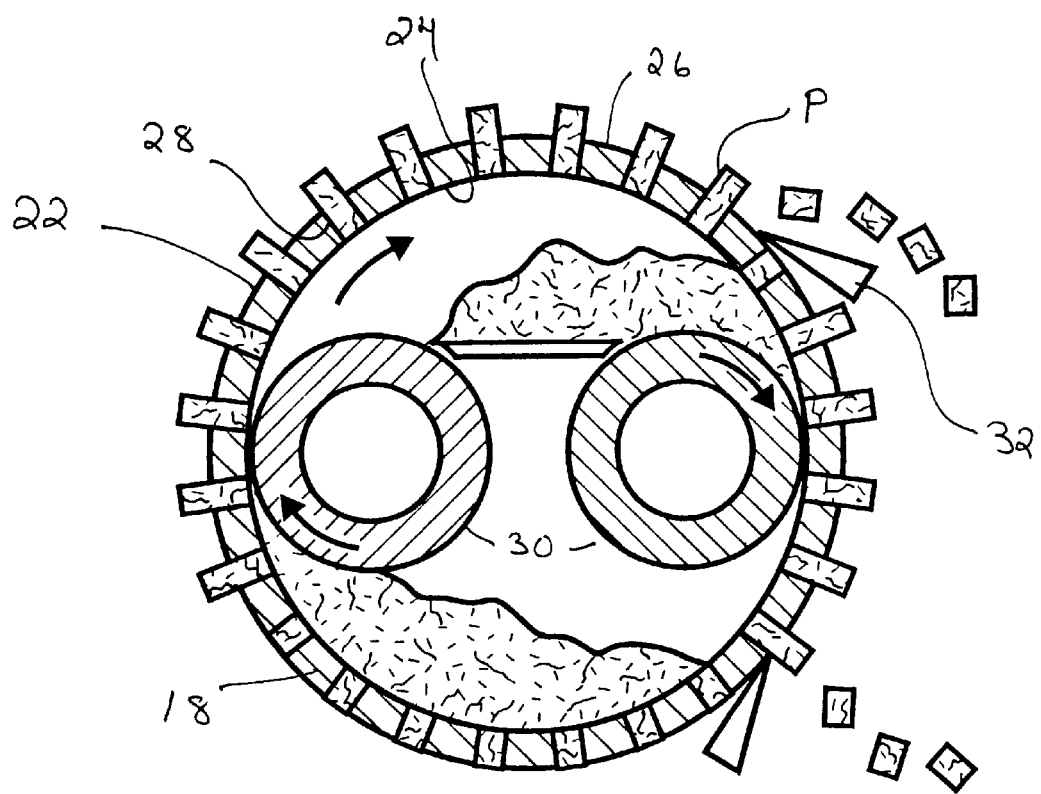
FIG. 2 is a cross-section of a cylindrical die used in the pellet mill illustrated in FIG. 1.

Referring to FIG. 2, the die 18 includes a generally cylindrical drum 22 having a hollow interior with inner and outer surfaces 24 and 26, respectively, and a plurality of die holes or openings 28 passing through the cylindrical drum from the inner surface to the outer surface. Within the drum, there is provided a pair of rollers 30 driven by the drum. It will be appreciated that the rotation of the die in contact with the rollers causes the rollers to rotate. The material carried by the rotation of the die is compressed between the die and the rolls and forced through the holes or openings in the die. As the pellets P are extruded, a knife 32 shears the pellets in predetermined lengths for discharge through the outlet chute 20.

In accordance with the present invention, the die 18 is formed of a hot-work tool steel of an H-group of hot-work tool steels. The die 18 may be formed of a chromium hot-work steel in the type H10 up to and including H19 range, which have good resistance to heat softening resulting from their chromium content and carbide forming elements. Additionally, other alloys from the tool steel A-group, D-group, the balance of the H-group, the T-group, and the M-group could be used. Preferably, H13 is the material of choice for the die 18. The surfaces of the die 18, including the inner surface 24, outer surface 26 and surfaces defining the holes or openings 28 are nitrided, preferably by a gas-nitriding, case-hardening process. However, plasma nitriding or salt nitriding processes could also be used. Thus, these surface areas are characterized by increased surface hardness, improved resistance to wear, improved fatigue life and corrosion resistance.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pellet mill die construction for pelleting particulate material, comprising:

a pelleting die having first and second surfaces on opposite sides of said die and a plurality of die holes through said die extending between said first and second surfaces for passing the particulate material between said first surface and said second surface, said die being formed of H-group alloy steel, with one of said first surface, said second surface and said plurality of die holes having a nitrided surface layer for wear resistance.

2. A die construction according to claim 1 wherein said nitrided surface layer is formed on a H13 alloy.

3. A die construction according to claim 1 wherein said nitrided surface layer is formed of a case hardened H13 alloy.

4. A die construction according to claim 1 wherein said die comprises a cylinder with said first and second surfaces constituting inner and outer surfaces, respectively, of said cylinder with said holes extending between said inner and outer surfaces.

5. A die construction according to claim 4 wherein said inner surface of said cylindrical die body has the nitride layer formed on a H-group alloy.

6. A die construction according to claim 5 wherein said nitrided surface layer is formed on a case hardened H13 alloy.

7. A die construction according to claim 4 wherein said outer surface of said cylindrical die body has the nitrided layer formed on a H-group alloy.

8. A die construction according to claim 7 wherein said nitrided surface layer is formed on a case hardened H13 alloy.

9. A die construction according to claim 4 wherein said plurality of die holes of said cylindrical die body has the nitrided layer formed on a H-group alloy.

10. A die construction according to claim 9 wherein said nitrided surface layer is formed of a case hardened H13 alloy.

11. A pelleting mill comprising:

a particulate material feeder;

an inlet for supplying particulate material to the feeder;

a cylindrical pelleting die for receiving the particulate material from said feeder, said pelleting die having inner and outer surfaces and a plurality of die holes through said cylindrical die extending between said inner and outer surfaces for passing the particular material from said inner surface through said holes to said outer surface;

at least one knife for shearing the particulate material passing through the holes to said outer surface to form pellets;

one of said inner surface, said outer surface and said plurality of holes having a nitrided surface layer formed on a H-group alloy for wear resistance; and an outlet for discharging the pellets from the pellet mill.

12. A pellet mill according to claim 11 wherein said nitrided surface layer is formed on a H13 alloy.

13. A pellet mill according to claim 11 wherein said nitrided surface layer is formed of a case hardened H13 alloy.

\* \* \* \* \*